(12) United States Patent
Defoort et al.

(10) Patent No.: US 7,684,325 B2
(45) Date of Patent: Mar. 23, 2010

(54) METHOD FOR NETWORK ANALYSIS AND NETWORK ANALYSER MODULE

(75) Inventors: Frank Defoort, Kruibeke-Bazel (BE); Margherita La Fauci, Antwerp (BE); Paul Van Esbroeck, Beveren (BE); Joachim Van Leeuwe, Mortsel (BE)

(73) Assignee: Alcatel, Paris (FR)

( * ) Notice: Subject to any disclaimer, the term of this patent is extended or adjusted under 35 U.S.C. 154(b) by 918 days.

(21) Appl. No.: 11/487,306

(22) Filed: Jul. 17, 2006

(65) Prior Publication Data
US 2007/0064620 A1 Mar. 22, 2007

(30) Foreign Application Priority Data
Sep. 16, 2005 (EP) ................... 05291927

(51) Int. Cl.
*H04L 12/26* (2006.01)
(52) U.S. Cl. ..................................... 370/230
(58) Field of Classification Search ......... 370/229–236, 370/241, 248; 379/93.01, 93.08; 725/146–151
See application file for complete search history.

(56) References Cited

U.S. PATENT DOCUMENTS

| | | | | |
|---|---|---|---|---|
| 6,052,380 | A * | 4/2000 | Bell | 370/445 |
| 6,542,465 | B1 * | 4/2003 | Wang | 370/232 |
| 6,973,037 | B1 * | 12/2005 | Kahveci | 370/236 |
| 7,079,552 | B2 * | 7/2006 | Cain et al. | 370/469 |
| 7,088,678 | B1 * | 8/2006 | Freed et al. | 370/230 |
| 2003/0182666 | A1 * | 9/2003 | You | 725/111 |

FOREIGN PATENT DOCUMENTS

JP 2005/060208 6/2005

OTHER PUBLICATIONS

Law A M et al: "Simulation Software for Communications Networks: The State of the Art." IEEE Comm. Magazine, NY, NY, vol. 32, No. 3, Mar. 1994, pp. 44-50.

* cited by examiner

Primary Examiner—Dmitry H Levitan
(74) Attorney, Agent, or Firm—Harness, Dickey & Pierce, PLC

(57) ABSTRACT

A method for network analysis in an access network (1) in connection with a data transmission network, in particular an xDSL network, with a plurality of subscriber lines (4.1-4.3). The method comprising the step of collecting data on physical layer operational parameters ($\{\phi_{oi}\}$) of at least one subscriber line (4.1-4.3) and the steps of simulating a behavior of higher network layers based on said collected data when deploying at least one application (6.1-6.3) on said subscriber line (4.1-4.3); generating data on higher layer performance parameters for said application (6.1-6.3); and generating an advice signal (AS) based on said data and indicative of the compatibility of the physical layer/application couple with predetermined Quality-of-Service (QoS) requirements for said application (6.1-6.3). Thus, the proposed method provides network operators with information concerning the question if a given service application (6.1-6.3) will run on a respective data transmission (core and access) network (1, 1') in accordance with the QoS values recommended for said application (6.1-6.3), in particular a high-bandwidth rich media service type application, e.g. a triple-play service.

11 Claims, 2 Drawing Sheets

METHOD FOR NETWORK ANALYSIS AND NETWORK ANALYSER MODULE

BACKGROUND OF THE INVENTION

The invention is based on a priority application EP05291927.1 which is hereby incorporated by reference.

The invention relates to a method for network analysis in an access network in connection with a data transmission network, in particular an xDSL network, with a plurality of subscriber lines, the method comprising the step of collecting data on physical layer operational parameters of at least one subscriber line.

The invention also relates to a network analyser module for an access network in connection with a data transmission network, in particular an xDSL network, with a plurality of subscriber lines, the network analyser module comprising means for collecting data on physical layer operational parameters of at least one subscriber line.

Additionally, the invention relates to an xDSL network analyser, an integrated circuit, and an access multiplexer linecard comprising an inventive network analyser module, as well as to a computer program product for network analysis being operable to translate the inventive method into practise.

Due to the fast introduction and spreading of broadband technologies as well as in response to increased competitive pressure and consumer demands, a great number of new applications in the field of rich media services, e.g. delivery of video, VoIP (voice over IP), or gaming, are being developed. Other services of this kind are referred to as triple-play services (voice, video, and data), and require stable high-quality broadband connections—in addition to an overall increased bandwidth—for effective and reliable service delivery over data transmission (or communications) networks, such as a DSL and ADSL networks. In this context, the performance of a communication system is usually expressed in terms of QoS (Quality of Service). Depending upon the communication system in question, QoS may relate to service performance, SNR (Signal to Noise Ratio), BER (Bit Error Ratio), throughput rate, reliability, priority, delay, packet loss, number of visual disturbances per hour and other factors specific to each service. QoS is of particular concern for the continuous transmission of the above-mentioned high-bandwidth video and multimedia information, and can be measured in terms of an average delay, losses of transmission units (bits, cells, frames, or packets), or a transmission error rate, for instance. However, the network operators generally do not know if a newly developed application will run on their network (core and access) with the recommended QoS values. Furthermore, it is generally not possible for them to determine the error rate at the level of the application, e.g. video, VoIP, gaming, etc.

DLM (Dynamic Line Management) is a known prior art approach which is aimed at maximising data rates and maintaining quality and stability in communications networks (cf. ALCATEL Technology White Paper "Dynamic Line Management for Digital Subscriber Lines"). DLM allows switching of user/service profiles based on physical layer measurements of the MTBE (Mean Time Between Error Events) or MTBR (Mean Time Between (spontaneous) Resynchronisations). To this end, operational data is collected in order to determine physical line conditions during operation of the network in a non-stationary noise environment. Lines that are identified as stable are then assigned profiles with the highest bit rates possible, based on the physical quality of the line. In accordance with the measurement of physical layer operational parameters, a DLM module will switch a given line to a different profile in an attempt to offer a higher bit rate, ensure improved quality and stability, or reduce crosstalk owing to reduced transmit PSD (Power Spectral Density).

However, as only physical layer parameters are considered DLM does not provide a solution to the above-mentioned issue concerning the QoS requirements per type of application, e.g. delay, errors, etc.

SUMMARY OF THE INVENTION

It is the object of the invention to devise a method and a device which provide network operators with information concerning the question if a given service application will run on a respective data transmission (core and access) network in accordance with the QoS values recommended for said application, in particular a high-bandwidth rich media service type application, e.g. a triple-play service.

According to a first aspect of the invention the object is achieved by a method of the above-mentioned type, further comprising the steps of simulating a behaviour of higher network layers based on said collected data when deploying at least one application on said subscriber line; generating simulation data on higher layer performance parameters for said application; and generating an advice signal based on said simulation data and indicative of the compatibility of the physical layer/application couple with predetermined Quality-of-Service (QoS) requirements for said application.

According to a second aspect of the invention the object is also achieved by a network analyser module of the above-mentioned type, further comprising means for simulating a behaviour of higher network layers based on said collected data when deploying at least one application on said subscriber line; means for generating simulation data on higher layer performance parameters for said application; and means for generating an advice signal based on said simulation data and indicative of the compatibility of the physical layer/application couple with predetermined Quality-of-Service (QoS) requirements for said application.

The object of the invention is also achieved by an xDSL network analyser, an integrated circuit, and an access multiplexer linecard for an access network in connection with a data transmission network, in particular an xDSL network, all of which comprise a network analyser module according to the invention, and by a computer program product operable to perform the inventive method.

As a general idea the invention makes use of the simulated behaviour of the higher layers to formulate advices on the feasibility of a given application or application mix in connection with a given network or a given transmission line. In this context, the physical layer(s) define(s) all electrical and physical specifications for devices operating in the network. The major functions performed by the physical layer(s) are establishment and termination of connections to a communications medium, participation in sharing communication resources among users, and conversion between user data representation and transmitted communications signals. The higher layers comprise in particular network layers, transport layers, session layers, presentation layers, and the actual application layer, which interfaces directly to the application process.

Note that the invention is not limited to collecting data by performing measurements on the physical (lowest) layer only, in which case all higher layers of the layer hierarchy up to the (topmost) application layer have to be simulated. Rather, collection of data for the simulation may also be performed by additionally measuring parameters from higher layers (up to a specific layer below the application layer). In this case, the behaviour of the application layer may be predicted by performing such measurements at and below that specific layer, and by simulating the behaviour of all higher layers. However, an approach without performing measurements at all (relying exclusively on simulations) is not practical, such that at least operational parameters of the physical layer have to be measured in any case.

From measured "real life", i.e. operational data of at least the physical layer parameters in connection with simulated data from the higher layers, QoS parameters for different service applications (video, VoIP, gaming, . . . ) are calculated and compared with predefined threshold values in order to determine whether or not said QoS parameters satisfy specific requirements for a particular type of service, e.g. with respect to allowable frame or packet loss, delay, and jitter in the case of VoIP services, which can be quantified by means of an R-value or a MOS (Mean Opinion Score; ranging from 1.0 (total lack of satisfaction) to 5.0 (complete satisfaction)). Said combination of real life physical layer data and simulated higher layer values leads to accurate QoS related advices on application feasibility on the network.

Furthermore, owing to the inventive combination, configuration parameters of the physical layer can be set to meet said specific QoS requirements. Thus, in a preferred embodiment of the method according to the invention, said method further comprises the step of generating a modification advice signal indicative of a modification of at least one physical layer configuration parameter of said subscriber line required to fulfill at least one predetermined Quality-of-Service (QoS) requirement for said application in accordance with, i.e. in dependence of, said advice signal. In this way, it may be determined that a user should be switched to a profile using a different interleaver depth if a corresponding delay requirement is not met, which would be indicated by means of the modification advice signal, e.g. if a measured delay time rises above a predetermined delay threshold value. Correspondingly, in a preferred embodiment the inventive network analyser module further comprises means for generating a modification advice signal indicative of a modification of at least one physical layer configuration parameter of said subscriber line required to fulfill at least one predetermined Quality-of-Service (QoS) requirement for said application in accordance with said advice signal.

As reference is made above to physical layer configuration parameters in contrast to physical layer operational parameters, these terms will be shortly explained in the following: Configuration parameters are physical layer parameters which can be controlled directly, such as minimum requested & maximum allowed bitrate, minimum & maximum noise margin, maximum power sent on the line, maximum allowed delay, minimum impulse noise length to be correctable, etc. As a matter of fact, still a lot of freedom is given to a DSL modem pair in order to set up a physical layer connection within these given constraints. In contrast to this, physical layer operational parameters are "real-life" parameters of the subscriber line which can be directly measured, including two types: (a) chosen configuration parameters, including actual bitrate, actual noise margin, actual power on the line, actual delay, actual impulse noise length, etc. and (b) performance parameters, including actual BER, actual MTBE (mean-time-between-errors), actual MTBR, etc. Those performance parameters can only be controlled indirectly by the configuration parameters. Consequently, the operational parameters of the subscriber line represent the quantities to be measured and the configuration parameters represent the quantities to be controlled.

A further highly preferred variant comprises the further steps of substituting said collected data with said modification advice signal and repeatedly performing the simulating and generating steps described above until the at least one physical layer configuration parameter fulfills the at least one predetermined Quality-of-Service (QoS) requirement. The modification advice signal is then used to re-simulate the behaviour of the given application on top of an as-if-modified physical layer, resulting in a new modification advice signal. This process can be repeated many times until the QoS requirement for the configuration parameter is fulfilled.

Advantageously, in a further development of the inventive method, the latter further comprises the step of automatically adapting the at least one physical layer configuration parameter of said subscriber line in accordance with said modification advice signal in order to fulfill at least one predetermined Quality-of-Service (QoS) requirement for said type of application. In this way, said modification advice signal can be used to directly control the setting of the physical layer to achieve a desired QoS for a particular application. Correspondingly, according to a further development the inventive network analyser module preferably comprises means for automatically adapting at least one physical layer configuration parameter of said one subscriber line in accordance with said modification advice signal in order to fulfill at least one predetermined Quality-of-Service (QoS) requirement for said application. Due to the indirect influence of the physical layer configuration parameters on the physical layer operational parameters, it is advisable to check if the QoS requirement is actually met by repeating the steps described above (including the step of collecting data about the physical layer operational parameters) several times, if necessary, until the QoS requirement is met.

Thus, real life physical layer parameter values and simulated higher layer behaviour—and optionally dedicated operator input concerning any one of said layers—are used in combination to forecast the feasibility of a given application or application mix with respect to QoS requirements in the form of an "application simulation advice" for suitable output to the network operator. Alternatively or additionally, an advice can be issued on suitable changes of the physical line parameters in order to fulfill the QoS requirements. Finally, physical line configuration parameters could be adapted automatically in order to satisfy the QoS recommendations ("application-aware DLM").

Further advantages and characteristics of the present invention can be gathered from the following description of preferred embodiments with reference to the enclosed drawings. The features mentioned above as well as below can be used in accordance with the invention either individually or in conjunction. The embodiments mentioned are not to be understood as an exhaustive enumeration but rather as examples with regard to the underlying concept of the present invention.

BRIEF DESCRIPTION OF THE DRAWINGS

FIG. 1 shows a digital data transmission system in the form of an xDSL, e.g. ADSL, access network 1 wherein several hundreds or thousands of DSL modems 2.1-2.3 (also referred to as users/subscribers) are connected to an access multiplexer DSLAM 3, also referred to as DSL central office (CO). To illustrate the working principle of the present invention, only three of these modems 2.1-2.3 are depicted for reasons of clarity. The modems 2.1-2.3 are coupled to the CO 3 by means of twisted pair copper transmission lines 4.1-4.3, generally also referred to as subscriber lines. Physical layer configuration parameters of data transmission on the individual subscriber lines 4.1-4.3—denoted $\{\phi_{ci}\}$ wherein i is an index indicative of a particular subscriber line—can be controlled by means of dedicated physical layer control means 5.1-5.3 comprised in the CO 3. The brackets { . . . } denote a set, i.e. a plurality of physical layer parameters.

Figure 1:
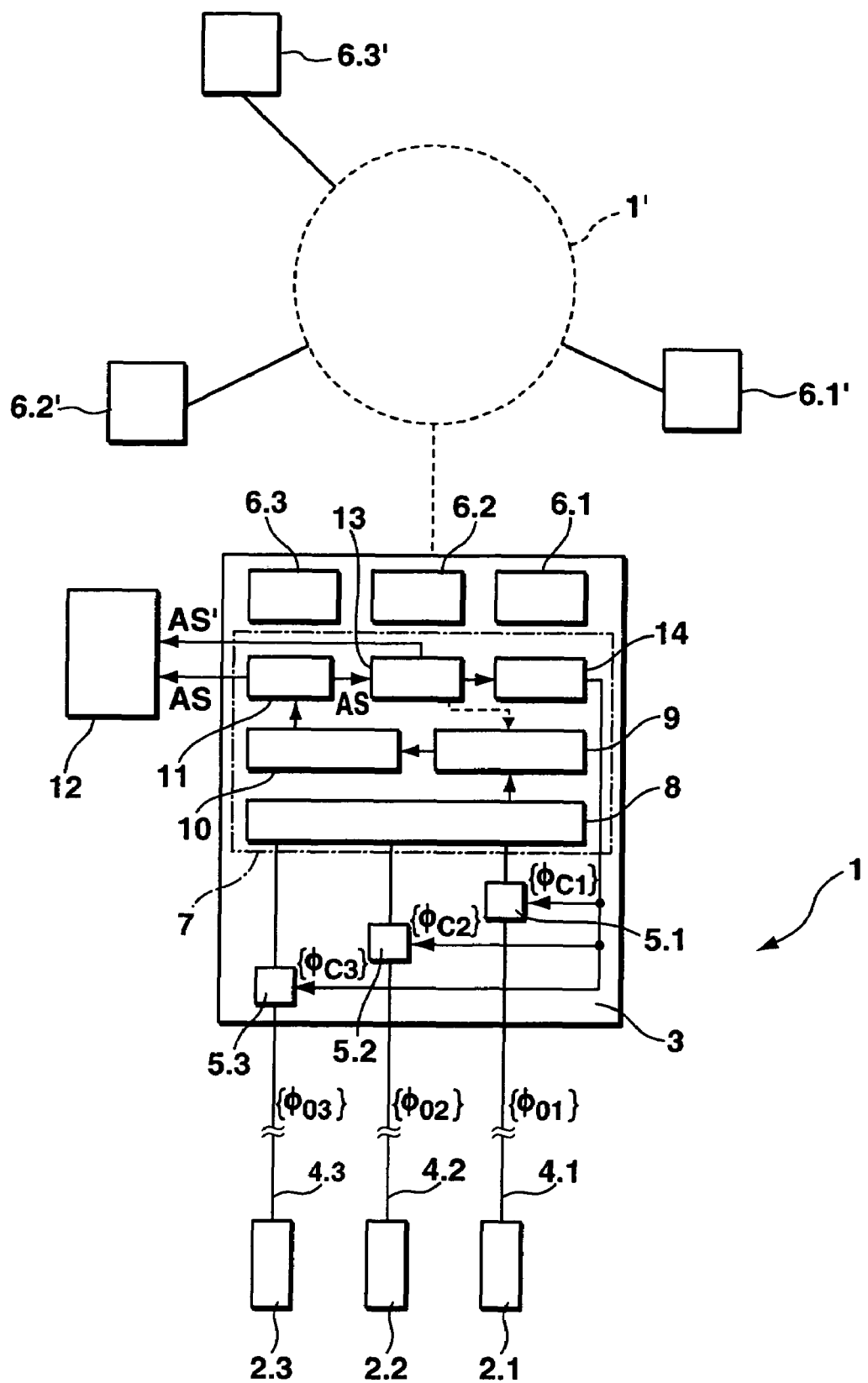
FIG. 1 is a schematic block diagram of an access network comprising a network analyser module according to the invention.

The network 1 is arranged for deployment of a plurality of service applications 6.1-6.3, in particular high-bandwidth applications such as VoIP, network-based games, video, or media rich triple-play services, which require a respective Quality-of-Service (QoS), e.g. in terms of delay, packet loss, or jitter, in order to be deployable over the network to the satisfaction of a user. These applications are demanded and/or accessed by the users 2.1-2.3 via a respective subscriber line 4.1-4.3 using a specific set $\{\phi_{ci}\}$ of physical layer configuration parameters. In particular, application data are sent to the users 2.1-2.3 via said corresponding subscriber lines 4.1-4.3. In this way a given application and the demanding subscriber (line) form a physical layer/application couple, which has to meet predetermined QoS criteria. As depicted in FIG. 1, the applications 6.1-6.3 can be included in the access network 1 itself. Alternatively or additionally applications can also be comprised in a further data transmission network 1' (e.g., a core network) in operative connection with the access network 1 and depicted with dashed lines in FIG. 1. Such applications have been assigned reference numerals 6.1'-6.3' in FIG. 1.

For to analyse and/or control said QoS criteria the CO 3 further comprises a network analyser module 7 according to the invention, which can be devised either as an integrated circuit or as an access multiplexer (DSLAM) linecard, in software form in connection with suitable data processing and storing means (not shown in FIG. 1) or in a separate device, a Unix SUN machine, which is interconnected to the DSLAM (but not integrated in it), as known to a person skilled in the art. The network analyser module 7 includes means 8 for collecting data on "real life" physical layer operational parameters $\{\phi_{oi}\}$ of the subscriber lines 4.1-4.3. In the abovementioned case in which applications are also comprised in a further network 1' the physical layer parameters of the connection to said further network 1' would have to be taken into account, too, which will not be described in detail here. Furthermore, the network analyser module 7 comprises means 9 for simulating a behaviour of higher network layers when deploying at least one application on said one subscriber line.

For instance, data traffic representative of a given application could be generated, or pre-recorded voice conversations could be played back in the case of an VoIP application. Also, BER data collected by the means 8 for collecting data from the physical layer can be translated by simulating the fault propagation through higher layers into visual artefacts on a TV screen for a certain video application with certain coding means. Alternatively, in an VoIP application, delay data collected by the means 8 can be translated into acoustical echo noise by simulation. The behaviour of other network layers situated between an actual application and the physical layer (cf. the standard Open Systems Interconnection Reference (OSI) model) are included in the simulation. The inventive network analyser module 7 also comprises means 10 for generating simulation data on higher layer performance parameters for said application. In the case of an VoIP application, this could include computation of R-values (user satisfaction score ranging from 1 (worst) to 100 (best)), which would then be correlated to the MOS. In case of a video application, this could include the number of visual artefacts per hour, or the image quality (standard TV quality, VCR quality, HDTV quality, DVD quality, etc.

Furthermore, the inventive network analyser module 7 comprises means 11 for generating an advice signal AS based on said simulation data and indicative of the compatibility of the physical layer/application couple with the above-mentioned predetermined QoS requirements for said application 6.1-6.3, preferably by comparing said data with a predefined threshold value. For instance, the advice signal AS could indicate that a given physical layer/application couple does not meet the QoS requirement for a VoIP application if the calculated MOS value is determined to lie below 2,0 or another predefined threshold value. For video applications, the advice signal AS could for instance indicate that a given physical layer/application couple does not meet the QoS requirement for the video application if the calculated number of visual disturbances per hour is higher than 2. In the embodiment shown, the advice signal AS is sent to an output device 12, e.g. a display screen or a logging unit, such that the network operator is provided with information as to the feasibility of a given application with respect to the performance of the network.

Said means 11 for generating the advice signal AS are in operative connection with means 13 for generating a modification advice signal AS' indicative of a modification of at least one physical layer configuration parameter $\phi_{ci}$ of the subscriber line 4.1-4.3 in question. This modification is required to fulfill at least one predetermined QoS requirement for said type of application in accordance with said advice signal AS. For providing the information about this modification to e.g. a network operator, the means 13 for generating said modification advice signal AS' are also connected with the above-mentioned output device 12, such that the network operator is provided with information as to the required modification of the physical layer in order to achieve feasibility of a given application, which may then be translated into practise through network maintenance.

In the embodiment shown, the means 13 for generating said modification advice signal AS' are further connected with the simulation means 9 in order to re-simulate the behaviour of the given application on top of an as-if-modified physical layer, resulting in an altered modification advice signal AS'. This process can be repeated in an iterative manner as many times as necessary for the QoS requirement to be fulfilled.

Furthermore, the means 13 for generating said modification signal are further connected with means 14 for automatically adapting at least one physical layer configuration parameter $\phi_{ci}$ of the subscriber line in question. This is accomplished in accordance with the advice signal AS in order to fulfill at least one predetermined QoS requirement for said type of application. To this end, said parameter adapting means 14 are operatively connected with the physical layer control means 5.1-5.3 described above for directly affecting the physical layer configuration parameters $\{\phi_{ci}\}$ of a given subscriber line 4.1-4.3.

Figure 2:
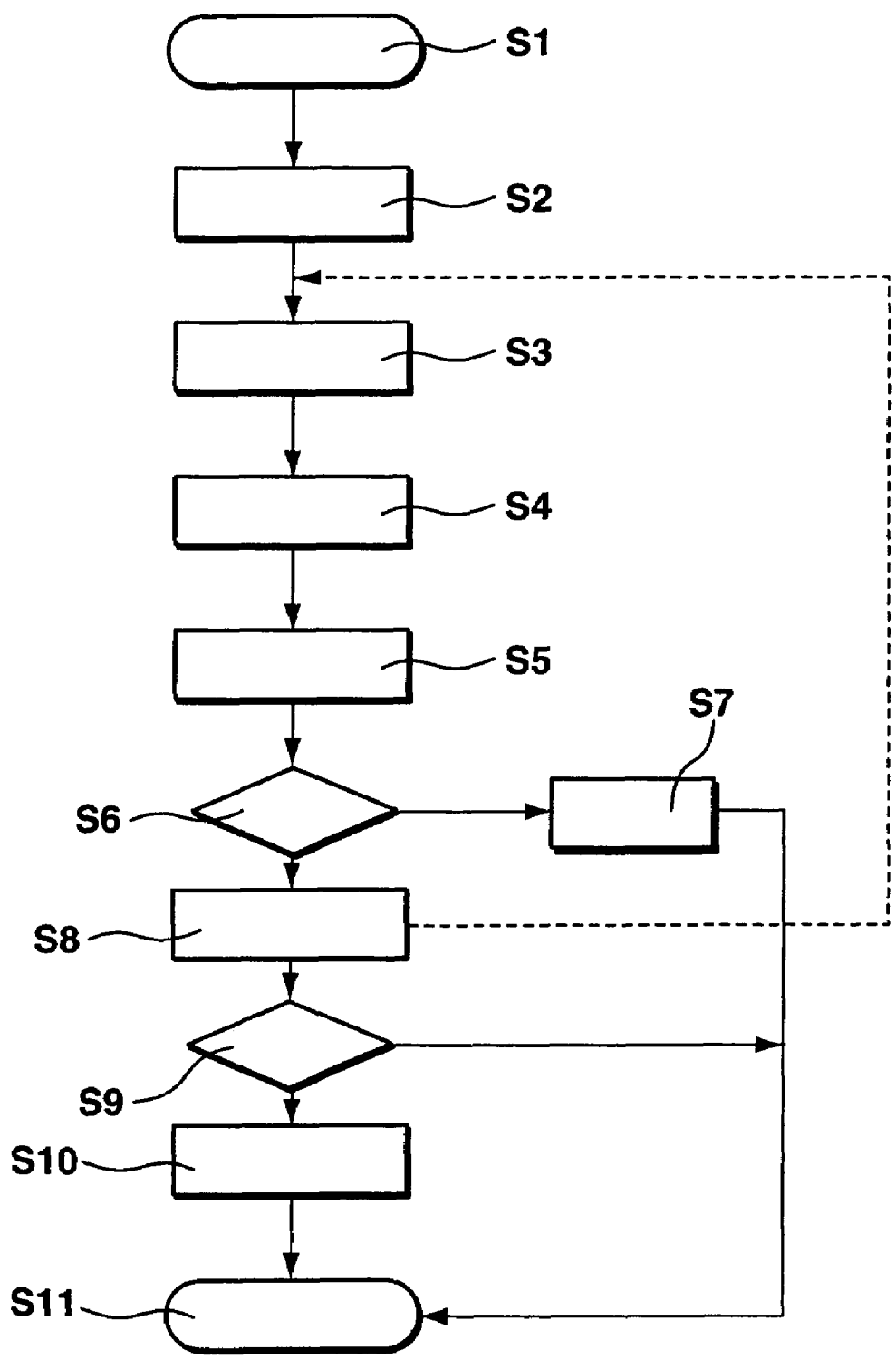
FIG. 2 a flow chart illustrating the different steps of a method according to the invention.

FIG. 2 shows a flow chart of the inventive method for network analysis in an access network in connection with a data transmission network, in particular an xDSL network, with a plurality of subscriber lines, as translated into practise by means of the above-described network analyser module 7. The method commences in step S1, when a network operator wishes to gather information concerning the deployment of a newly developed service application or application mix. In subsequent step S2 data on physical layer operational parameters of at least one subscriber line are collected, whereupon in step S3 a simulation is performed with respect to the behaviour of higher network layers when deploying at least one such application on at least one subscriber line. As a result of this, simulation data on higher layer performance parameters for said application are generated in subsequent step S4, as has already been described above. In step S5 said simulation data are related with predefined QoS measures in order to determine whether or not a given application/line couple does meet the QoS requirements for the application in question, e.g. by comparison with predefined threshold values. Subsequent step S6 comprises a decision as to whether or not the data generated in step S4 should be used for in-depth modification advice and/or automatic physical layer parameter adaptation. If not, then in step S7 the advice signal AS (FIG. 1) "application simulation advice" is generated and output as described above in detail with reference to FIG. 1, and the method terminates in step S11.

Otherwise, in step S8 the modification advice signal AS' (FIG. 1) "physical extrapolation advice" is generated, it being possible to perform re-iterations of the simulation by providing the modification advice signal AS' as an input for simulation step S3 until the QoS requirements are met. In step S9 another decision is made as to whether or not an automatic adaptation of physical layer parameters should be performed. If not, the modification advice signal is output as described above in detail in connection with FIG. 1, and the method again terminates in step S11. Otherwise, in step S10 automatic parameter adaptation is performed on the physical layer configuration parameters of the network ("application-aware DLM"), such that the QoS requirements are met for a given application. Again, the inventive method terminates in step S11. By means of these features of the present invention, operators are provided with information as to whether or not an application "X" or application mix "X/Y" will run on a given transmission line, or which physical layer parameter values will have to be changed in order to meet the QoS requirements for a given application/application mix. In this way network operators will know beforehand that they will be able to deploy a given application or application mix while being confident about their operational stability. This leads to a decrease in operating expenditures (OPEX) because operators will be able to deploy new applications at short notice. At the same time the inventive approach allows ordering an increased number of transmission lines, in particular DSL lines.

Thus, the present invention provides network operators with information concerning the question if a given service application will run on a respective data transmission (core and access) network in accordance with the QoS values recommended for said application, in particular a high-bandwidth rich media service type application, e.g. a triple-play service. It is understood that although described in connection with data transmission networks of the xDSL type, the present invention may also advantageously be used in connection with other network types, e.g. coax networks or fiber networks.

The invention claimed is:

1. A method for network analysis in an access network in connection with a data transmission network including a plurality of subscriber lines, the method comprising:
   collecting data corresponding to physical layer operational parameters of at least one physical layer corresponding to at least one subscriber line;
   simulating a behavior of higher network layers, the simulation considering at least one application deployed on the at least one subscriber line, the simulation based on the collected data;
   generating simulation data corresponding to higher layer performance parameters for the at least one application based on the simulation; and
   generating an advice signal based on the simulation data, the advice signal indicating a compatibility of Quality-of-Service requirements for the at least one application with a combination of the at least one physical layer and the at least one application, the combination including the at least one application deployed on the at least one physical layer.

2. The method according to claim 1, further comprising:
   generating a modification advice signal indicative of a modification of at least one physical layer configuration parameter of the subscriber line required to fulfill at least one of the Quality-of-Service requirements for the application in accordance with the advice signal.

3. The method according to claim 2, further comprising:
   substituting the collected data with the modification advice signal and repeatedly performing the simulating and the generating until the at least one physical layer configuration parameter fulfils the at least one of the Quality-of-Service requirements.

4. The method according to claim 2, further comprising:
   automatically changing the at least one physical layer configuration parameter of the subscriber line in accordance with the modification advice signal in order to fulfill at least one of the Quality-of-Service requirements for a type of the application.

5. A network analyser module for an access network in connection with a data transmission network including a plurality of subscriber lines, the network analyser module comprising:
   means for collecting data corresponding to physical layer operational parameters of at least one physical layer corresponding to at least one subscriber line;
   means for simulating a behavior of higher network layers, the simulation considering at least one application deployed on the at least one subscriber line, the simulation based on the collected data;
   means for generating simulation data corresponding to higher layer performance parameters for the at least one application based on the simulation; and
   means for generating an advice signal based on the simulation data, the advice signal indicating a compatibility of Quality-of-Service requirements for the at least one application with a combination of the at least one physical layer and the at least one application, the combination including the at least one application deployed on the at least one physical layer.

6. The network analyser module according to claim 5, further comprising:
   means for generating a modification advice signal indicative of a modification of at least one physical layer configuration parameter of the subscriber line required to fulfill at least one of the Quality-of-Service requirements for the application in accordance with the advice signal.

7. The network analyser module according to claim 6, further comprising:
   means for automatically changing the at least one physical layer configuration parameter of the subscriber line in accordance with the modification advice signal in order to fulfill at least one of the Quality-of-Service requirement for the application.

8. An XDSL network analyser, comprising a network analyser module according to claim 5.

9. An integrated circuit, comprising a network analyser module according to claim 5.

10. An access multiplexer linecard for an access network in connection with a data transmission network having a plurality of subscriber lines, including a network analyser module according to claim 5.

11. A computer readable medium having computer readable instructions stored thereon for network analysis in an access network in connection with a data transmission network including a plurality of subscriber lines, the computer readable instructions configured to:

collect data corresponding to physical layer operational parameters of at least one physical layer corresponding to at least one subscriber line;

simulate a behavior of higher network layers, the simulation considering at least one application deployed on the at least one subscriber line, the simulation based on the collected data;

generate simulation data corresponding to higher layer performance parameters for the at least one application based on the simulation; and generate an advice signal based on the simulation data, the advice signal indicating a compatibility of Quality-of-Service requirements for the at least one application with a combination of the at least one physical layer application, the combination including the at least one application deployed on the at least one physical layer.

* * * * *